United States Patent [19]
Kovnat et al.

[11] Patent Number: 5,619,649
[45] Date of Patent: Apr. 8, 1997

[54] NETWORK PRINTING SYSTEM FOR PROGRAMMING A PRINT JOB BY SELECTING A JOB TICKET IDENTIFIER ASSOCIATED WITH REMOTELY STORED PREDEFINED DOCUMENT PROCESSING CONTROL INSTRUCTIONS

[75] Inventors: Larry A. Kovnat, Rochester; Diane S. Rogerson, Greece; Gerald M. Garavuso, Rochester, all of N.Y.

[73] Assignee: Xerox Corporation, Stamford, Conn.

[21] Appl. No.: 489,350

[22] Filed: Jun. 12, 1995

[51] Int. Cl.$^6$ ..................... G06F 13/00
[52] U.S. Cl. ............ 395/200.01; 395/101; 395/825; 364/710.13
[58] Field of Search ............... 395/147, 134, 395/163, 115, 600, 200.01, 101, 825; 364/131, 710.13; 370/94.1

[56] References Cited

U.S. PATENT DOCUMENTS

| | | | |
|---|---|---|---|
| 3,597,071 | 7/1971 | Jones | 355/3 |
| 4,503,499 | 3/1985 | Mason et al. | 364/200 |
| 4,769,771 | 9/1988 | Lippmann et al. | 364/200 |
| 4,821,107 | 4/1989 | Naito et al. | 358/256 |
| 4,970,554 | 11/1990 | Rourke | 355/202 |
| 5,021,892 | 6/1991 | Kita et al. | 358/468 |
| 5,043,881 | 8/1991 | Hamazaki | 364/200 |
| 5,047,955 | 9/1991 | Shope et al. | 364/519 |
| 5,086,497 | 2/1992 | Hoirkawa et al. | 395/147 |
| 5,113,393 | 5/1992 | Kam et al. | 370/94.1 |
| 5,113,494 | 5/1992 | Menendez et al. | 395/163 |
| 5,126,932 | 6/1992 | Wolfson et al. | 364/131 |
| 5,170,340 | 12/1992 | Prokop et al. | 364/143 |
| 5,175,633 | 12/1992 | Saito et al. | 358/406 |
| 5,223,948 | 6/1993 | Sakurai et al. | 358/404 |
| 5,276,799 | 1/1994 | Rivshin | 395/162 |
| 5,278,950 | 1/1994 | Takei et al. | 395/134 |
| 5,307,458 | 4/1994 | Freiburg et al. | 395/162 |
| 5,367,673 | 11/1994 | Goldsmith et al. | 395/600 |
| 5,436,730 | 7/1995 | Hube | 358/401 |
| 5,504,843 | 4/1996 | Catapano et al. | 395/115 |

Primary Examiner—Thomas C. Lee
Assistant Examiner—Duo Chen
Attorney, Agent, or Firm—Gary B. Cohen

[57] ABSTRACT

An approach suited for use with an arrangement including an image processing apparatus and a server, with the server being disposed remotely of the image processing apparatus, is provided. In practice, a user accesses the remotely disposed server from the image processing apparatus by entering an appropriate personal identification number and selecting a job ticket from a directory listing the job tickets resident at the server. One of the job tickets is then selected and transmitted across the network from the server to the image processing apparatus. A job is then programmed at the image processing apparatus with the selected job ticket.

16 Claims, 16 Drawing Sheets

NETWORK PRINTING SYSTEM FOR PROGRAMMING A PRINT JOB BY SELECTING A JOB TICKET IDENTIFIER ASSOCIATED WITH REMOTELY STORED PREDEFINED DOCUMENT PROCESSING CONTROL INSTRUCTIONS

The present invention relates generally to a technique for programming a job, with a job ticket, in a printing system and more particularly to an approach suited for use with an arrangement including an image processing apparatus and a server, with the server being disposed remotely of the image processing apparatus. In practice, a user accesses the remotely disposed server from the image processing apparatus by entering an appropriate personal identification number and selecting a job ticket from a directory listing the job tickets resident at the server. One of the job tickets is then selected and transmitted across the network from the server to the image processing apparatus. A job is then programmed at the image processing apparatus with the selected job ticket.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10,1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307,458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. Pat. No. 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5, 1994

The '262 patent, in contrast to the '401 British patent, compresses image data, prior to storing it in a page buffer, and decompresses the image data, prior to outputting it.

Programming a job is often achieved with a "job ticket". For many printing systems, the job ticket is provided in the form of one or more programmable dialogs, each programmable dialog including values which are selected with a user interface, such as the user interface found in a DocuTech® printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

As indicated above, some user interfaces can be rather simple in functionality. Indeed, it is difficult, if not impossible to develop a relatively complex job ticket on these simple types of user interfaces since they do not typically include a keyboard, which keyboard would be required to fully describe all of the necessary attributes of the job. In order to accommodate for the deficiencies of a simple user interface it is possible to store a preprogrammed job on a host machine or import a set of control instructions to a job memory bank, which job memory bank would be accessed by way of a job identifier printed, in terms of machine readable code, on a cover sheet.

Regarding storing jobs at a host printing machine, it is known that a set of job control instructions can be stored in a printing machine for eventual use in printing a set of image data. As will be recognized, storing job control instructions in this manner can decrease the amount of usable memory space in the host printing machine. Moreover, regarding accessing job control instructions at a job bank memory, it is known that a set of job control instructions can be generated at one location and stored at another location (job bank memory) for printing a job in accordance with the job control instructions. A teaching to this effect is provided in the following patent:

U.S. Pat. No. 4,970,554

Patentee: Rourke

Issued: Nov. 13, 1990

U.S. Pat. No. 4,970,554 discloses an arrangement in which a job ticket, characterized by a set of job control instructions, is developed at a workstation for a given job. The set of job control instructions are then designated with a job identifier and the control instructions themselves are provided to a job memory bank, which job memory bank communicates with one or more printers. In practice, the job identifier is printed at the workstation, in the form of machine readable code, on a cover sheet. The cover sheet is combined with a group of sheets, representing a document to be processed, to form a stack with the cover sheet on top. The stack is then scanned at one of the one or more printers so that the cover sheet is scanned first. Upon reading the machine readable code of the cover sheet, the one of the one or more printers accesses the job bank memory, with the job identifier read from the cover sheet to obtain the job control instructions corresponding with the job identifier. In turn, the other sheets of the stack are read, for the purpose of generating image data, and a set of prints is produced from the generated image data in accordance with the obtained job control instructions.

In certain situations, the arrangement of U.S. Pat. No. 4,970,554 is quite advantageous in that the job ticket is made portable and can thereby be used readily at a printer that is remote to the workstation. Nevertheless, the arrangement of U.S. Pat. No. 4,970,554 lacks a complete range of flexibility in that a user is constrained by the form in which a job identifier is entered to the printer. In particular, for a given job the user is provided with a cover sheet and the user is not provided with the opportunity to access the job memory bank and choose from a plurality of job control instruction sets. Moreover, unless the user possesses the cover sheet for a given job, there appears to be no way to access the job memory bank and obtain a desired set of control instructions. It would be desirable to provide a system with a server disposed remotely of an image processing apparatus (e.g. printing machine) in which one or more job tickets are stored in the server and a user can access the job tickets through use of a simple input subsystem, such as a keypad, at the image processing apparatus.

In accordance with one aspect of the present invention there is provided an image processing apparatus for use with a printing system of a type in which a first job is processed with an image processing apparatus for output at one or more of a plurality of output locations. The first job includes a set of image data processed in accordance with a set of job control instructions, assuming a form of a job ticket. The job ticket is associated with a second job and a job ticket identifier. The job ticket and job ticket identifier are part of a job ticket set. Both of at least some of the plurality of output locations and a server are disposed on a network with the server being disposed remotely of the image processing apparatus and including a first memory for storing the set. The image processing apparatus includes: a) an input subsystem for inputting a personal identifier to the image processing apparatus, the personal identifier being associated with one user; b) a display for displaying a directory of each job ticket stored for the one user in the job ticket set at the remotely disposed server, each job ticket being associated with a job ticket identifier, the job ticket identifier of the job ticket associated with the second job being included in the displayed directory, said input subsystem being adapted to permit the one user to select the job ticket identifier of the job ticket associated with the second job from the list for transmission to the image processing apparatus; c) a second memory for storing the job ticket; d) a retrieval subsystem for causing the set of job control instructions corresponding with the selected job ticket to be transmitted across the network from said first memory of the remotely disposed server to said second memory in response to both said inputting of said a) and a selection by the one user of the job ticket identifier of the job ticket associated with the second job; e) the set of image data being provided at the image processing apparatus; and f) an output subsystem for outputting a representation of the set of image data at one or more of the plurality of output locations.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
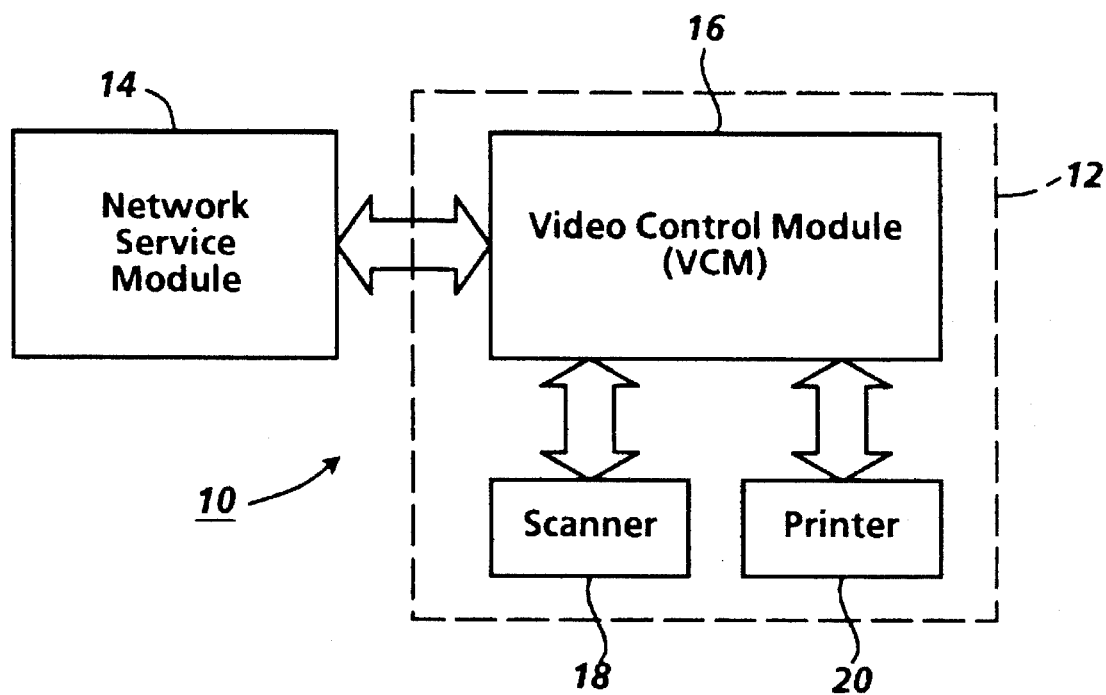
FIG. 1 is a block diagram depicting a multifunctional, network adaptive prig,ting machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
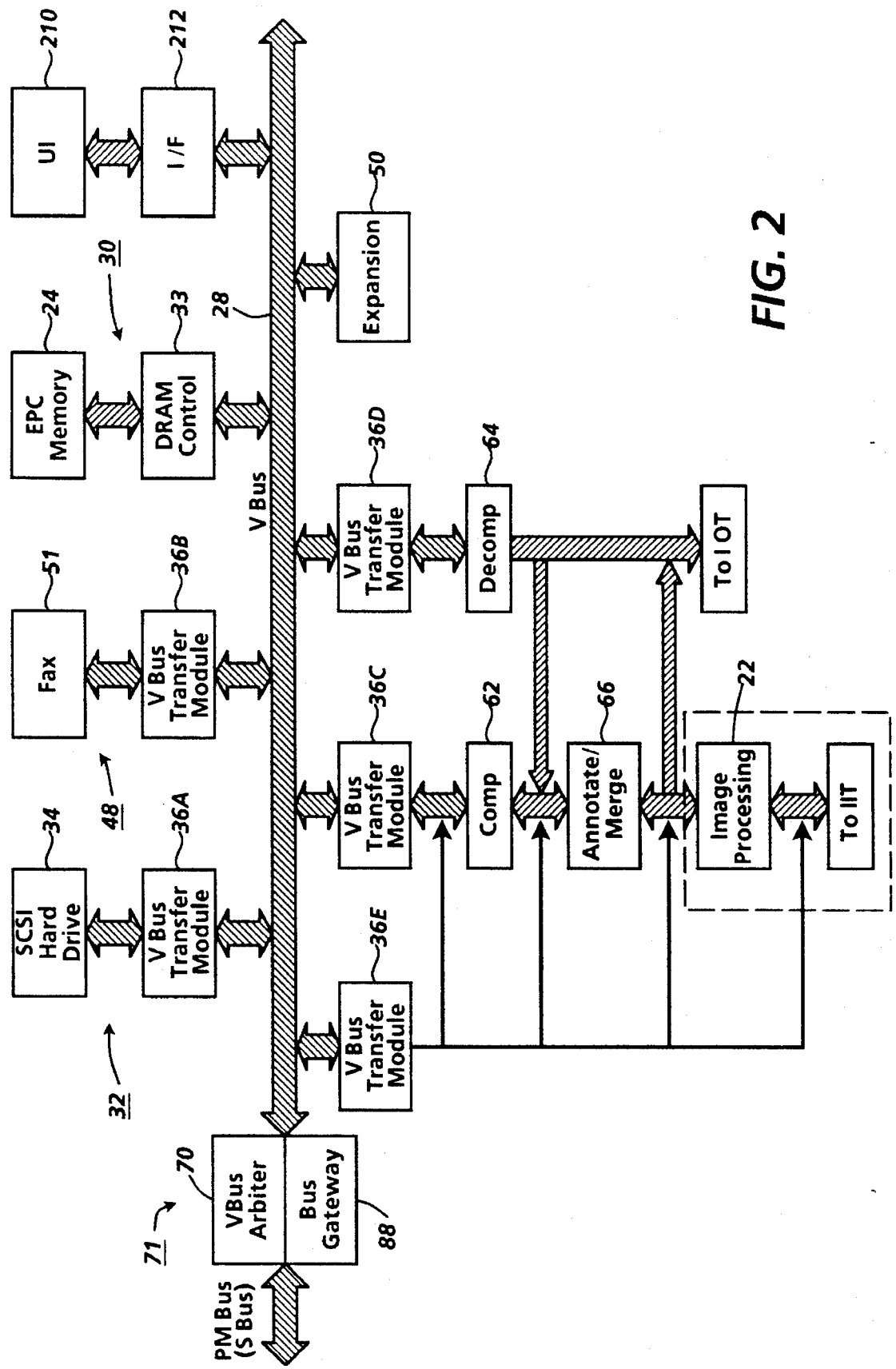
FIG. 2 is a block diagram of a video control module for the printing machine of FIG. 1.

Referring specifically to FIG. 2, the VCM 16 is discussed in further detail. The VCM 16 includes a video bus (VBus)

28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
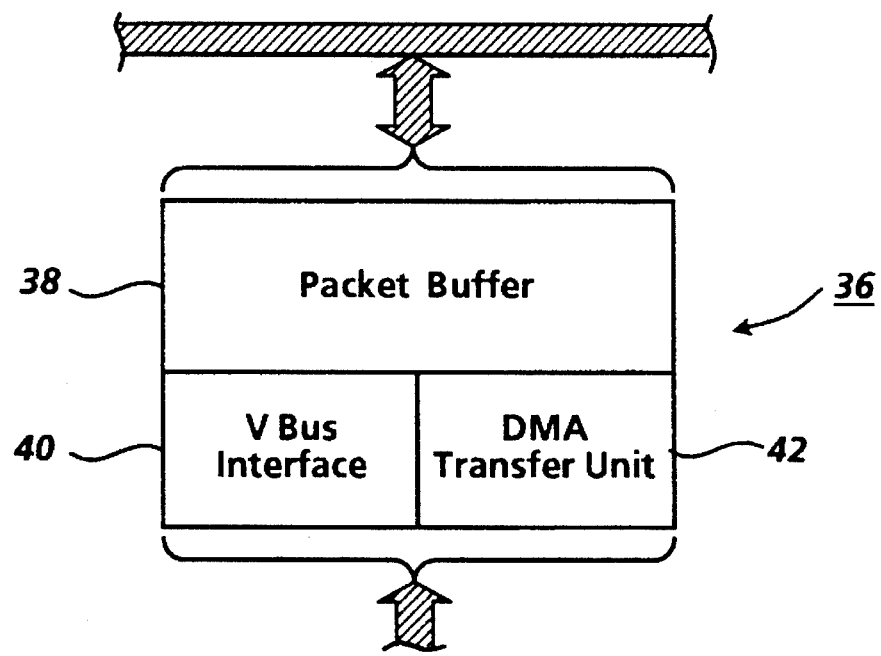
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes. Preferably, the packet size would be reduced for times when the VBus is relatively busy and increased for times when activity on the bus is relatively low.

Figure 5:
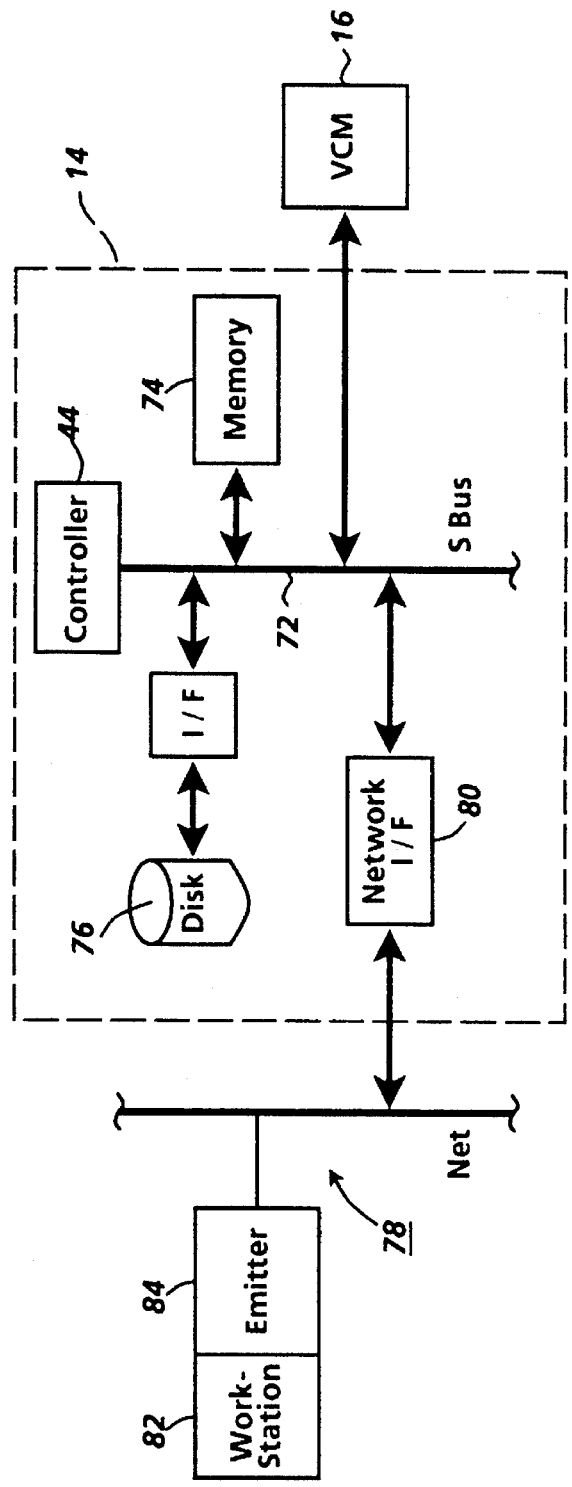
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each transfer unit employs a DMA transfer strategy to transfer a packet of image information. In accordance with such strategy, the beginning and end addresses of a packet are used by the transfer unit in implementing a given transfer. When a transfer is complete, the interface 40 transmits a signal back to the system controller 44 so that further information, such as desired packet size and address designations, can be obtained.

Figure 4:
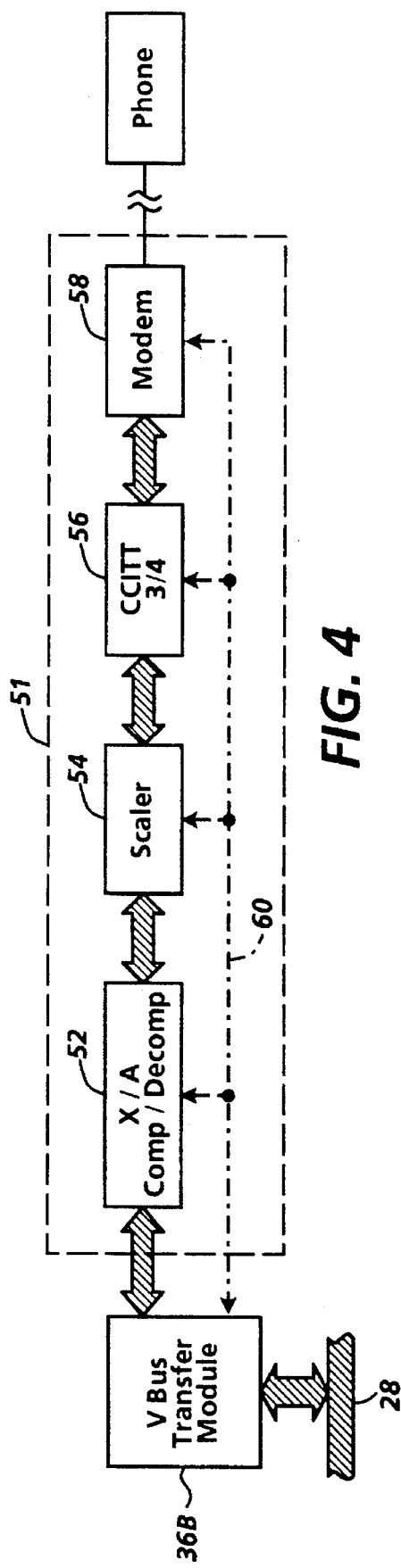
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Figure 19:
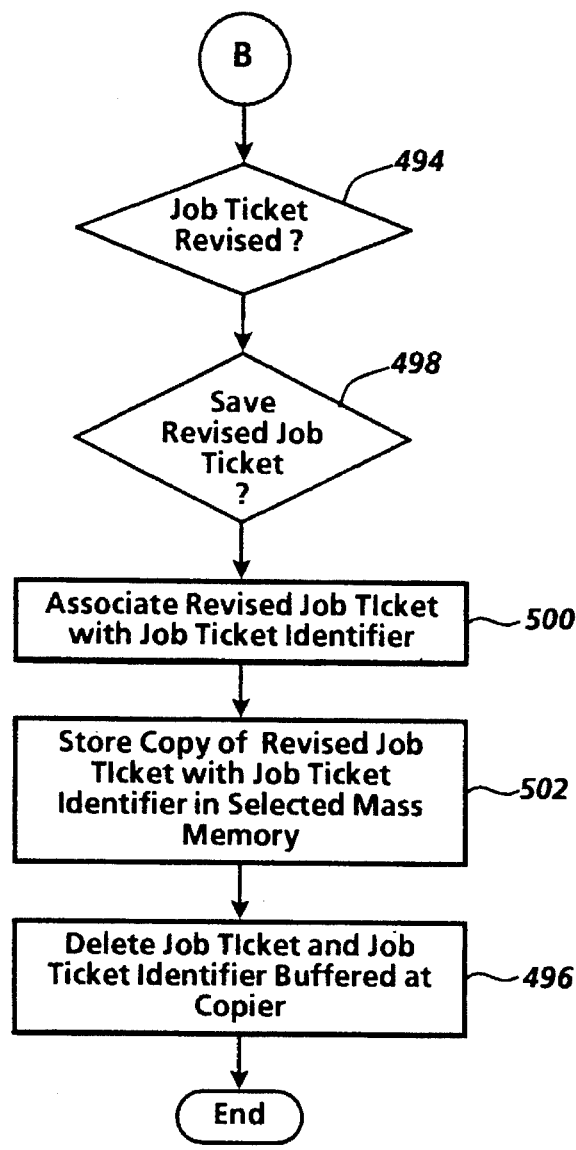

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
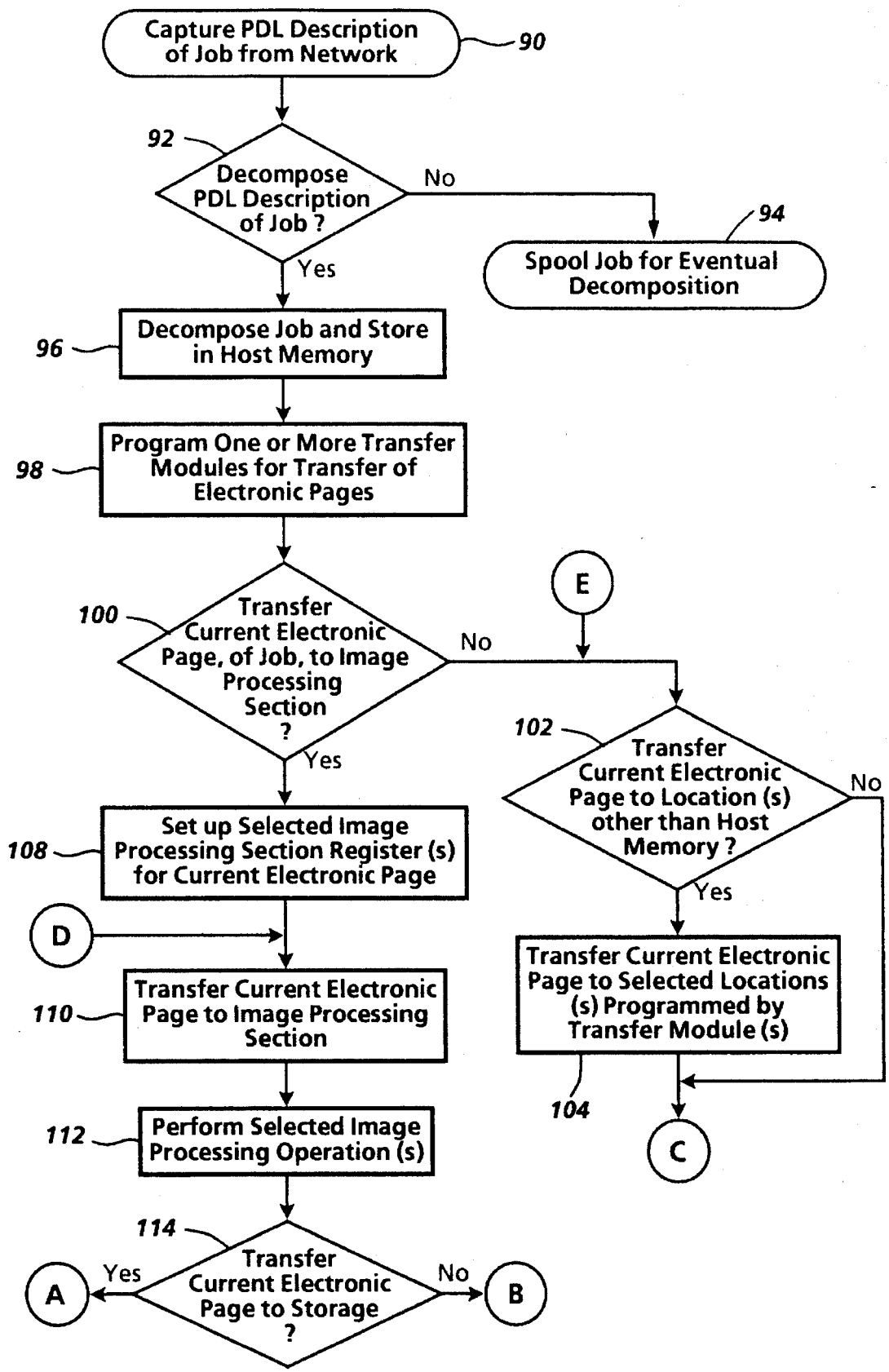
FIG. 6 and 7 represent a flow diagram for a loopback image processing method of the present invention.
Figure 7:
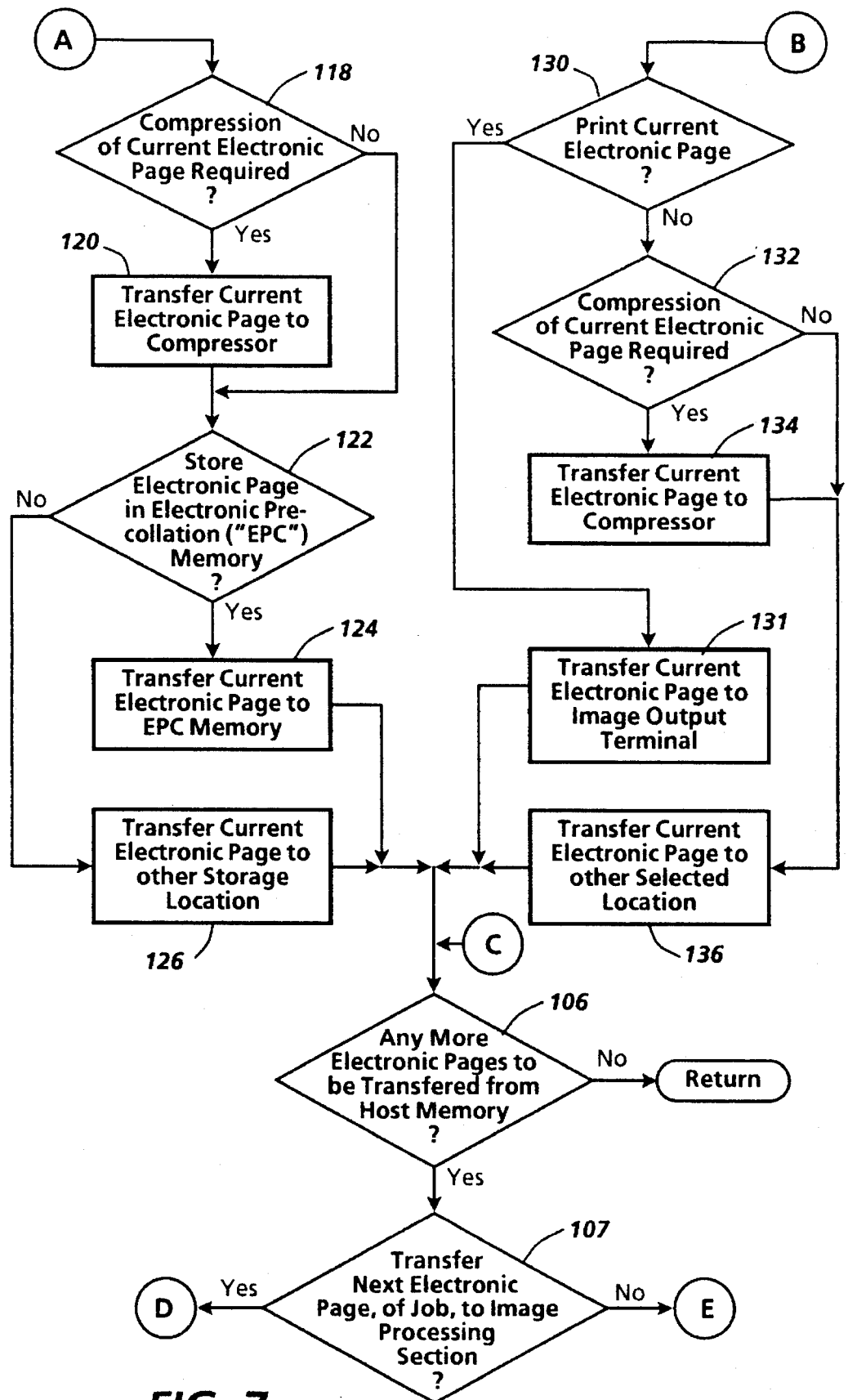

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
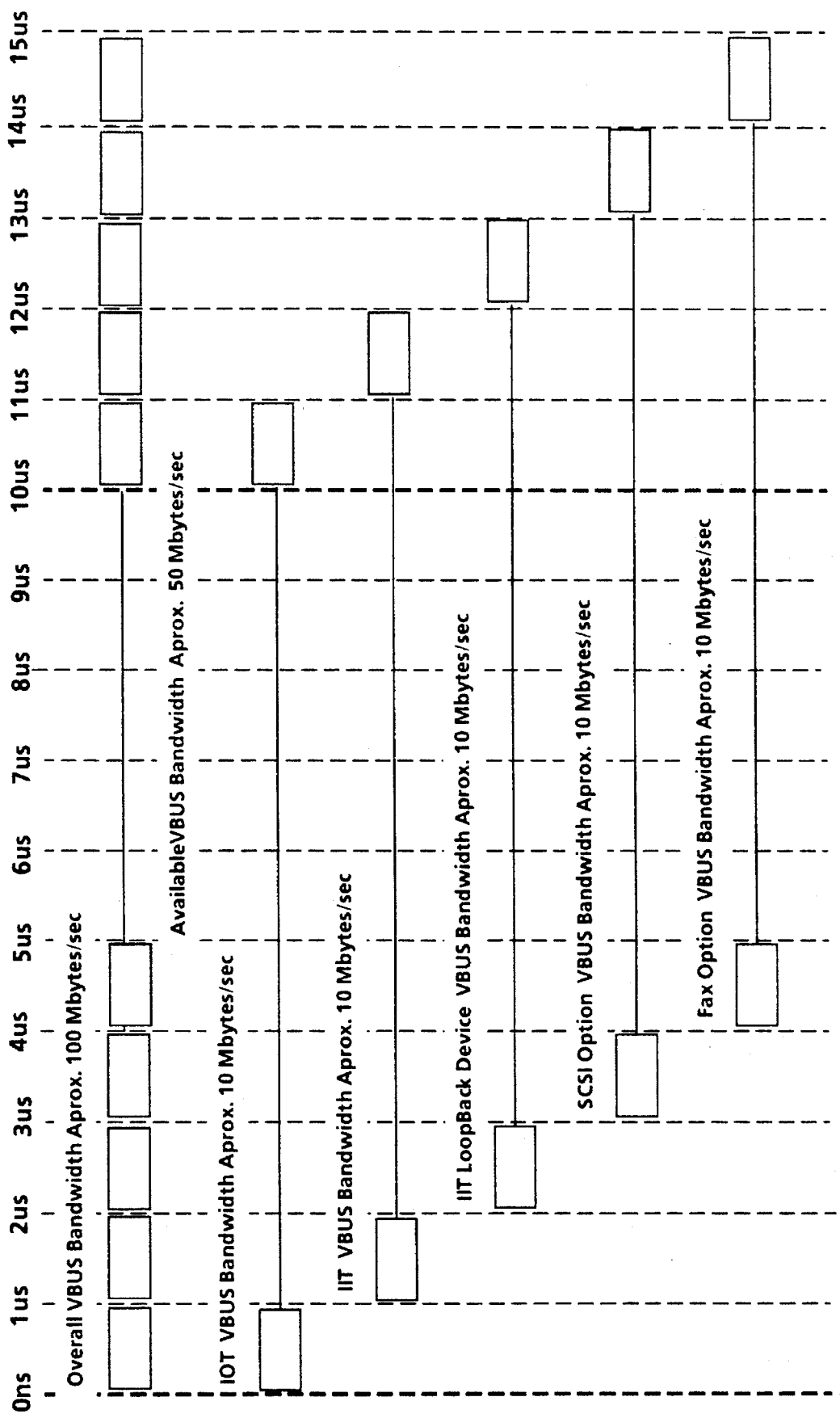
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Figure 9:
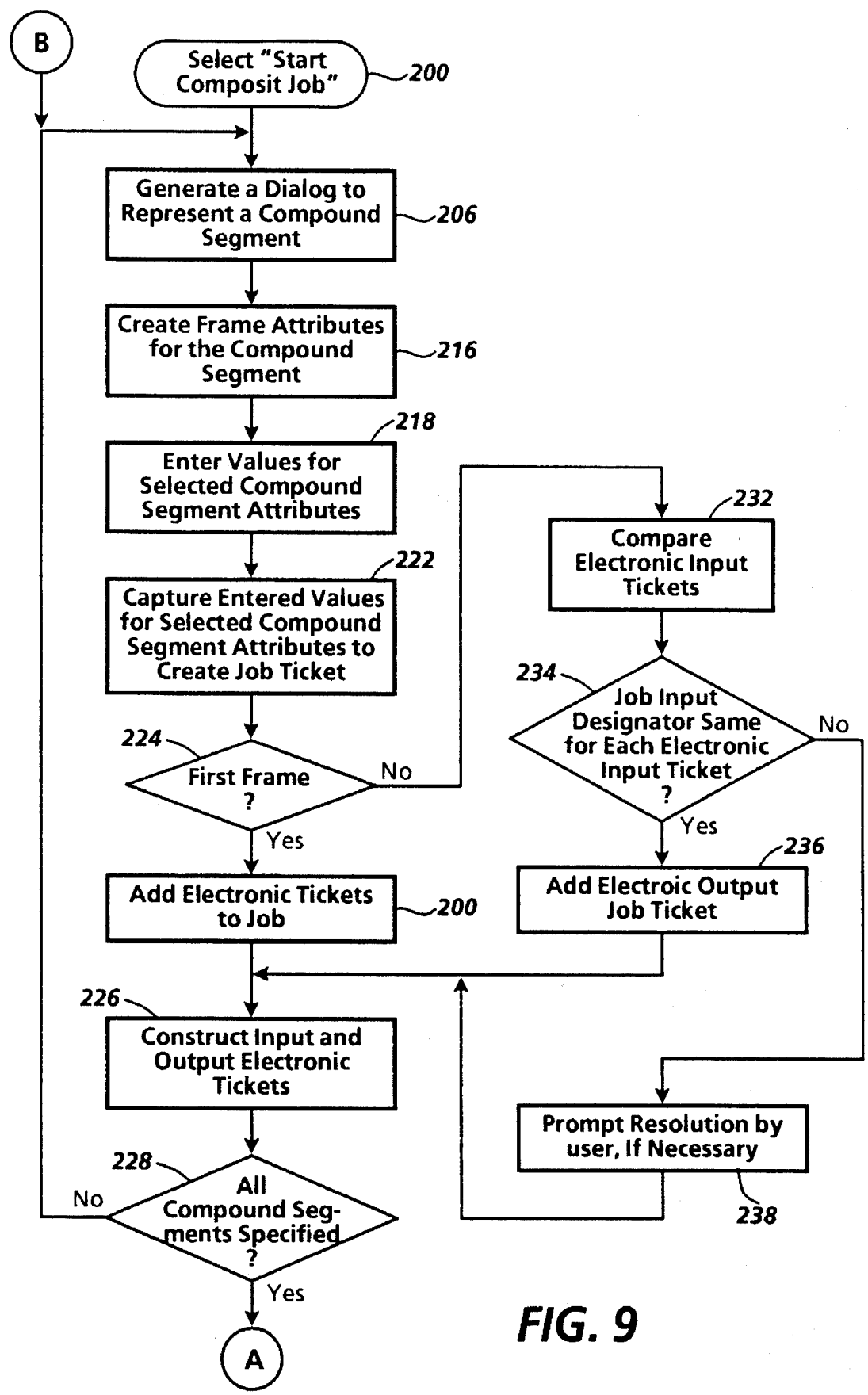
FIG. 9 is a flow diagram illustrating a first embodiment of developing a composite job ticket.
Figure 10:
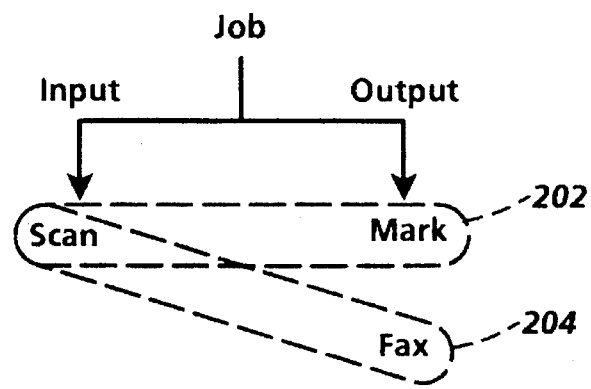
FIG. 10 is a schematic depiction of a job with two compounds.

Referring to FIG. 9, a technique for generating a composite job ticket is discussed. At step 200, the programming of a composite job ticket is initiated. Preferably, the composite job ticket is formed from one or more "compound segments" Referring to FIG. 10, a compound segment is defined, herein, as each pair of input/output designations used to describe the processing of a job. In the illustrated embodiment of FIG. 10, two compound segments, namely compound segment 202 and compound segment 204, are shown. As will be explained in further detail below, the current embodiment contemplates that, for a given job, the input aspect of each compound remains constant.

Figure 11:
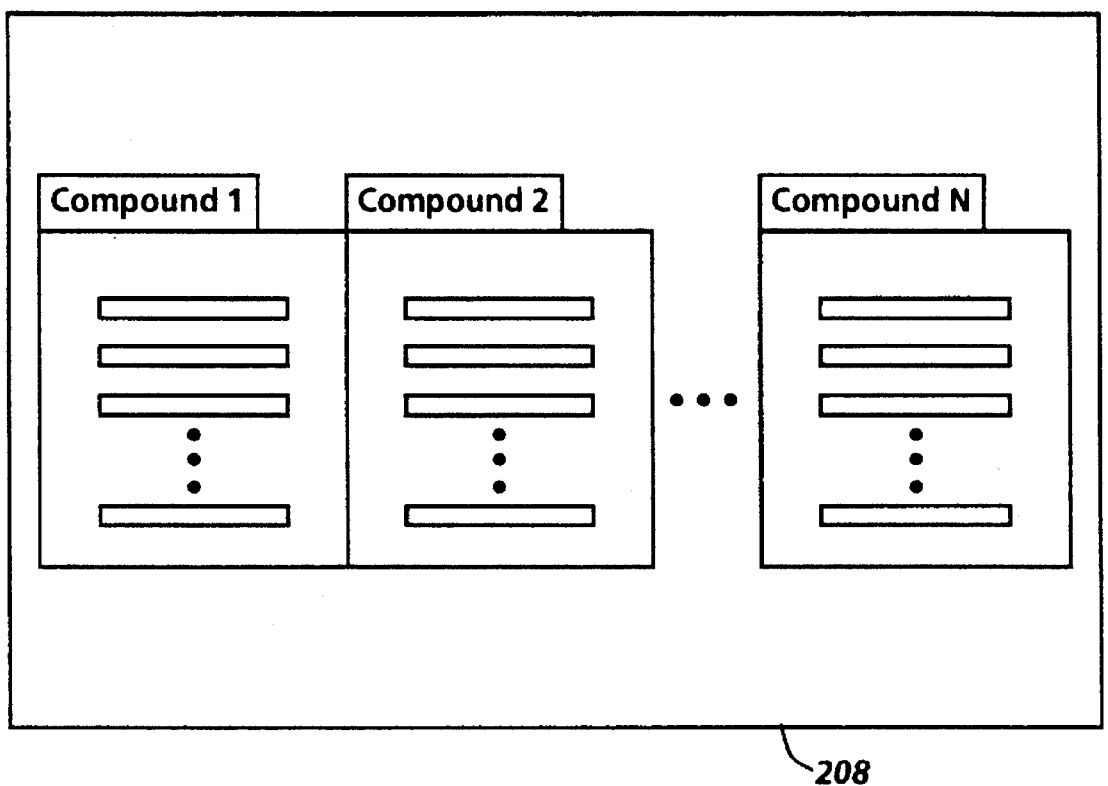
FIG. 11 is a display screen with a plurality of frames respectively configured as compounds, each compound including a plurality of attributes.

Referring again to FIG. 9, at step 206, a dialog, representing a single compound segment, is generated. As will appear, for a preferred composite ticket, multiple compounds will be formed. Referring to FIG. 11, as each compound segment is generated, it will appear on a screen 208, the screen residing on a user interface ("UI") 210 (FIG. 2), the user interface being coupled with the VBus 28 by way of a suitable UI interface 212. Any suitable UI, such as the UI used with the DocuTech® printing system, would be appropriate for use as UI 210. Each compound segment includes one or more frame attributes, each frame attribute being shown in a compound card as a blank rectangle. As is known, a job attribute refers to a job characteristic, such as a stock characteristic (e.g. stock size). The attributes serve as directives for the printing system 10 indicating the manner in which a job copy is inputted and/or outputted.

Referring again to FIG. 9, frame attributes are created for a selected compound segment (step 216) and values for those attributes are, via step 218, entered with the UI 210. In one example, a value would include the degree to which a portion of a job copy is to be edited, e.g. "cropped". Through use of the controller 44 (FIG. 5), the values of the selected compound segment are, via step 220, captured. It will be understood that for each compound segment or frame, two tickets, namely an input ticket and an output ticket, are programmed to provide suitable information to the printing system regarding the input/output attributes of the job. For the first programmed frame (step 222), the electronic input and output job tickets are, at step 224, added to the job and, at step 226, the values are set for the attributes to construct input and output electronic job tickets. If further compound segments are to be specified (step 228), then the process loops back to step 206, otherwise, the process process to a checking routine of FIG. 12. It will be appreciated that each of the electronic tickets are linked or coupled to one another by way of an appropriate referencing scheme, such as a link list. While, in the preferred embodiment, the electronic tickets are maintained in a link list, in other contemplated embodiments parallelism may be facilitated by placing the electronic tickets in an array.

Referring again to step 222, if the frame being programmed is not the first frame, then a conflict check is performed. As will appear, the conflict check insures that only one input is programmed for the job. At step 232, a comparison is performed between the various programmed input tickets of the job. It is then determined, at step 234, whether the job input designator of each programmed input ticket is the same. If the input designators are all the same, then the currently programmed output job ticket is, via step 236, added to the job. On the other hand, in the illustrated embodiment of FIG. 9, if a conflict exists between the input designators, then the process, at step 238, prompts the user to resolve the conflict.

Figure 12:
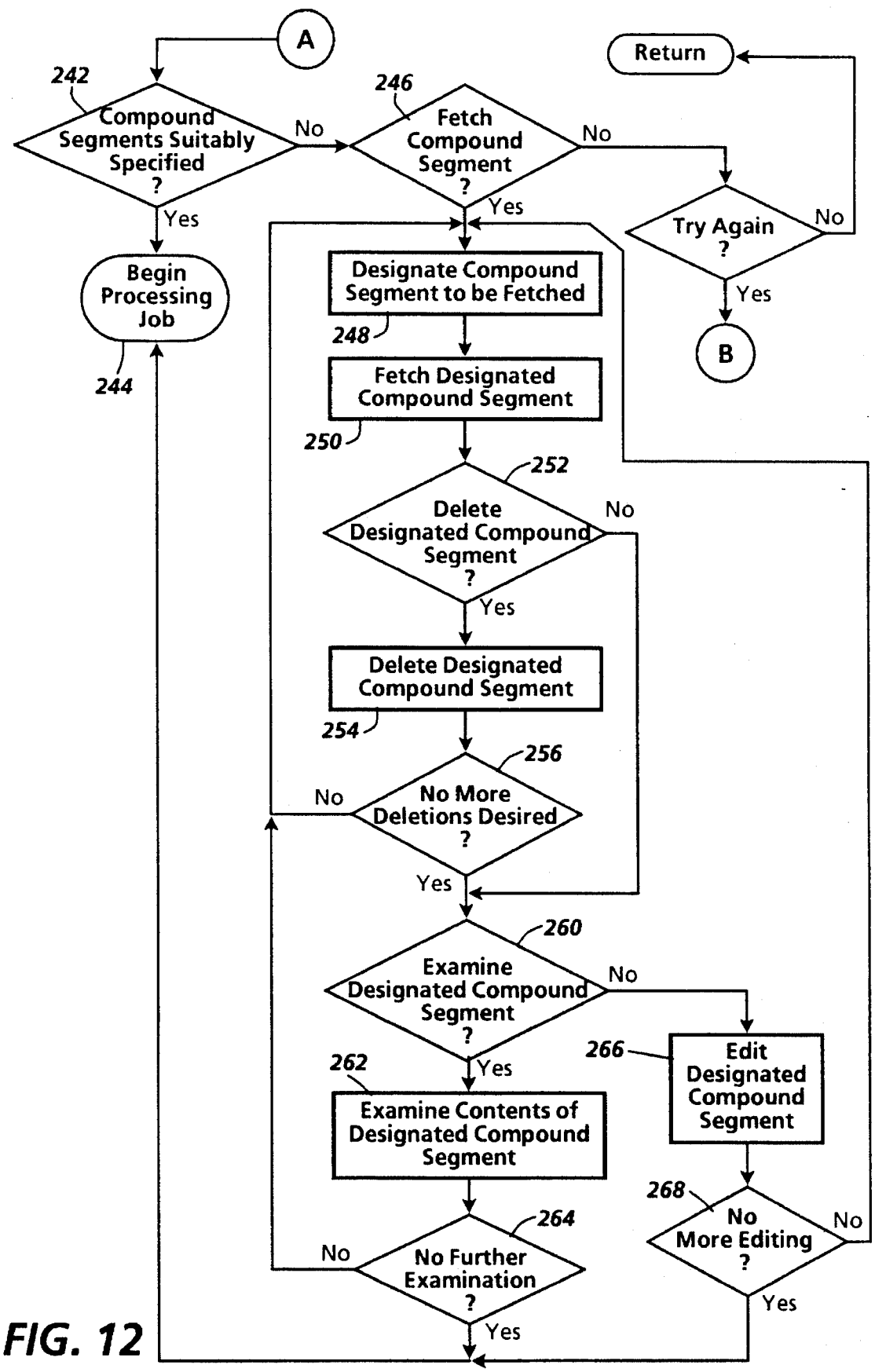
FIG. 12 is a flow diagram illustrating various functions that can be performed on a programmed composite job ticket.

Referring to FIG. 12, after the composite job ticket has been programmed, by way of the routine of FIG. 9, a user is provided with an opportunity to modify the programmed composite job ticket in various ways. At step 242, a check is performed to determine if the user wishes to make any modifications prior to processing the job. If the compound segments are all suitably specified, from the user's point of view, the job is then processed (step 244). In one example, the job is processed, with the scanner 18 (FIG. 2) and queued in EPC memory 24 for subsequent output to multiple destinations. If the user desires to make further modifications, then the process proceeds to step 246.

At step 246, the user may indicate that a modification (or examination) is desired. In this event, a compound segment to be fetched is designated (step 248) and the compound segment is fetched from one of the printing system memory sections (step 250). Once the designated compound segment is fetched, a decision is made, at step 252, as to whether it is to be deleted. If deletion is required, a deletion is performed at step 254 and a check is made, at step 256, as to whether another deletion is desired. If another deletion is desired, then the process loops back to step 248, otherwise the process proceeds to step 260 where a determination regarding examination is made.

If the user desires to examine a designated compound segment, then an examination opportunity is afforded at step 262. If further examination is required (step 264), then the process loops back to step 248 so that another compound segment can be fetched. If the user decides, at 260, not to examine the fetched compound segment, then the process is routed to step 266 where editing capability is provided. Editing can be achieved with a number of suitable graphics packages. If further editing is required (step 268), then the process loops back to step 248 where another compound segment is fetched.

Assuming that no further examination or editing is required (step 264 or 268) then processing of the job is begun at step 244. On the other hand, if the user decides, at step 246 that a new composite job ticket is to be composed, in place of the one just programmed, then the programming process can, by way of a positive decision at step 270, be reentered at step 206 (FIG. 9). At step 270, however, the user may decide to abort, which, in such case, a return to a main program, would be initiated.

Figure 13:
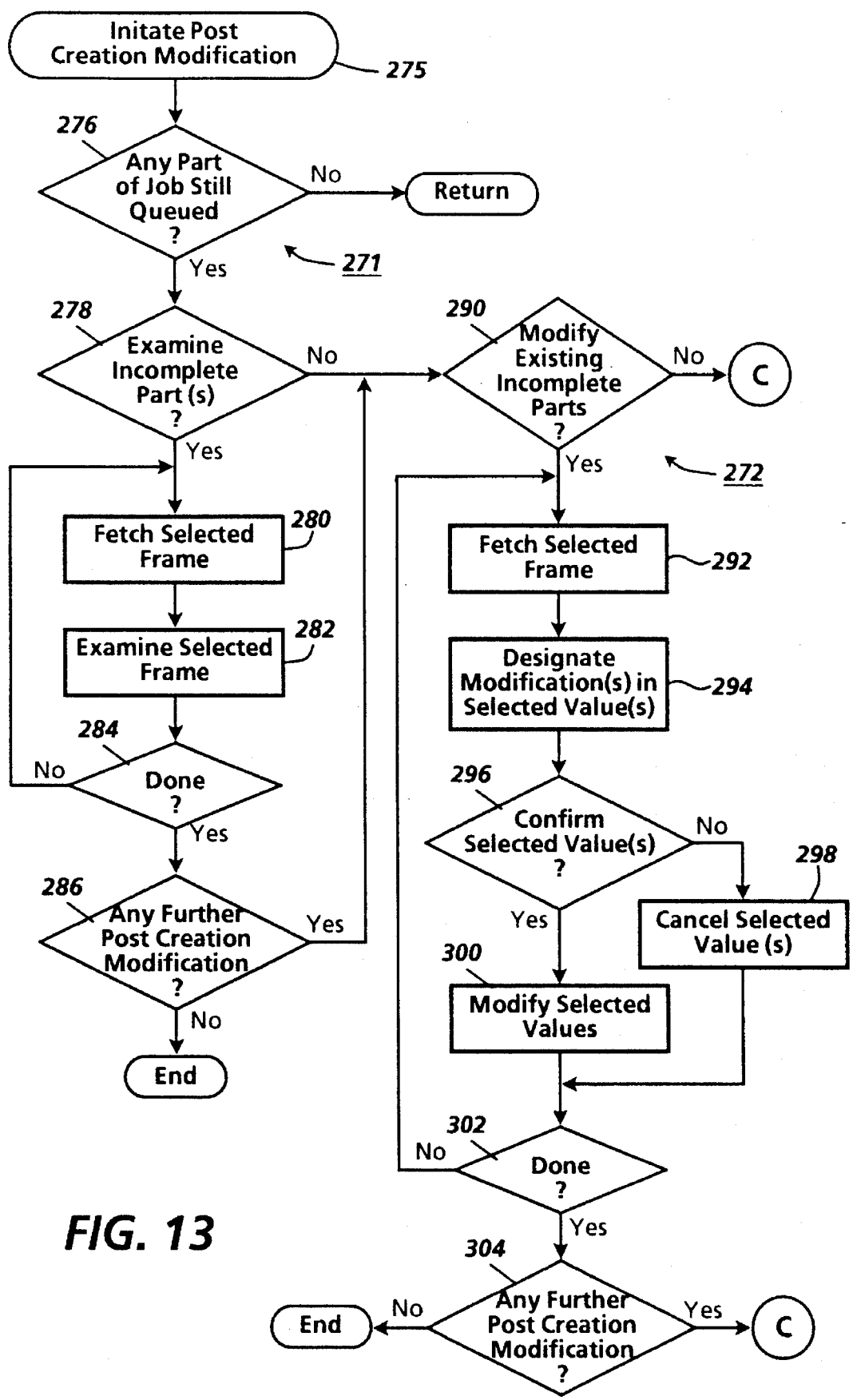
FIGS. 13 and 14 represent a flow diagram depicting various post creation modifications that can be performed on a stored composite job ticket.
Figure 14:
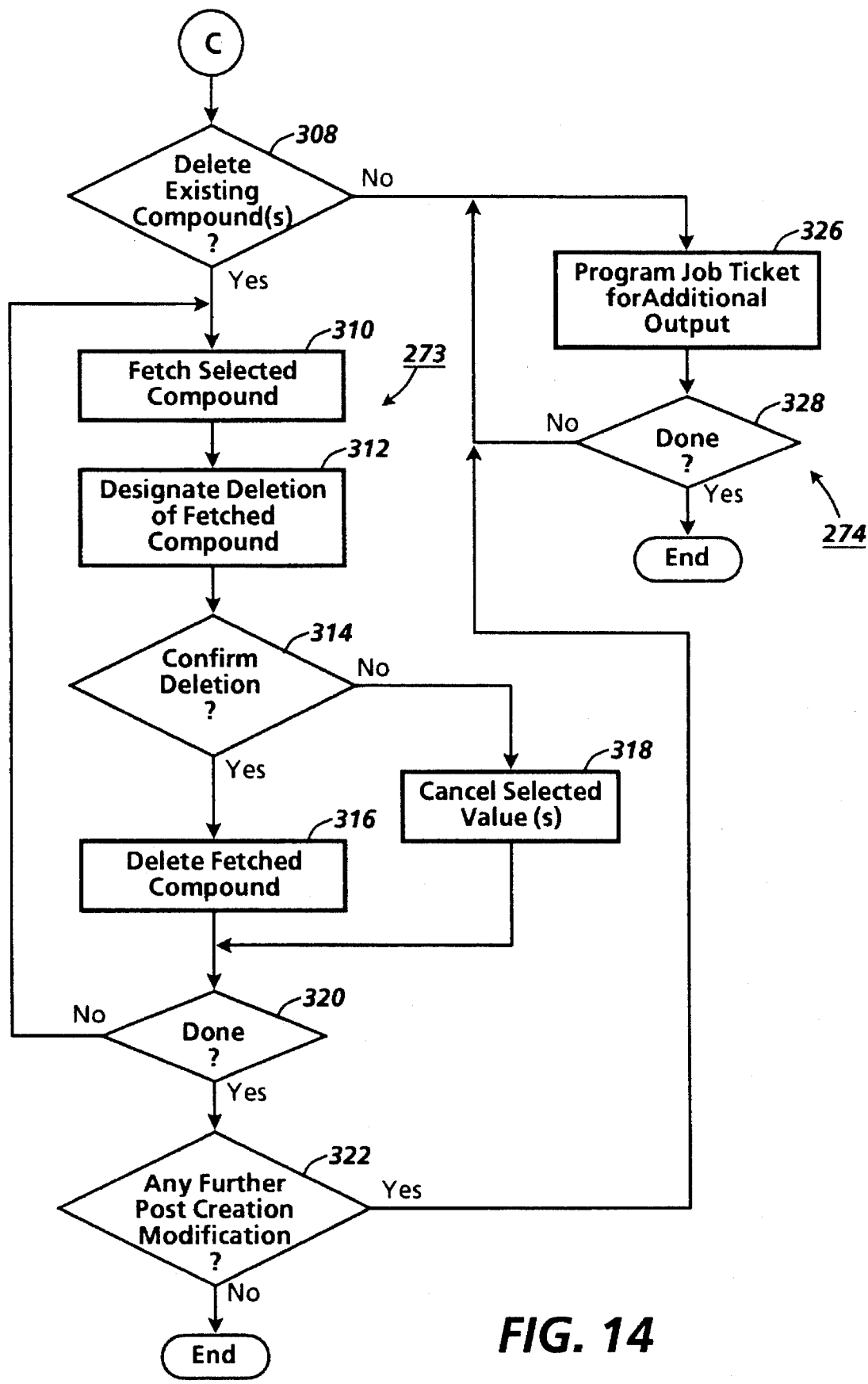

Subsequent to storing the link list of electronic tickets in memory, it may be desirable, among other things, to modify one or more of the stored tickets, delete one or more tickets, or even create another ticket. Referring to FIGS. 13 and 14, a post creation modification routine can be achieved through use of, among others, four subroutines, namely first subroutine 271, second subroutine 272, third subroutine 272 and fourth subroutine 274. In the illustrated embodiment of FIGS. 13 and 14, it is assumed that post creation modification is limited to four subroutines. It will be appreciated, however, that other modification subroutines are contemplated by the preferred embodiment.

At step 275, the post creation modification routine is initiated and, assuming that any part of the job is still queued (step 276), one of the four subroutines can be performed on that part of the job. It should be recognized that, in many examples, a job will not be maintained in memory after a designated number of copies of the job have been delivered to one or more programmed output destinations. The routine of FIG. 13 is performed for those parts of a job that still remain in memory.

At step 278, a check is performed to determine if a user desires to examine a part of the job by use of the first subroutine 271. If examination is desired, a frame, corresponding to a designated compound is fetched (step 280) and, at step 282, examined. The process may be continued through use of the decision at step 284. Once the user is finished with the first subroutine (step 286), s/he may proceed to the second subroutine or end.

If the user desires to use a subroutine other than the first subroutine (step 278) or simply proceed from the first subroutine (step 286), the process is directed to step 290. If the user desires to modify an existing part of the job, then a frame, corresponding to a designated compound is fetched (step 292) and the user, at step 294, designates a modification to be made with respect to a given value. In one example, the user may alter a previously programmed finishing or stock characteristic. Once the user has designated each value to be altered in the frame, the system, via step 296, prompts the user to confirm such designation. At that time, the user may cancel the designated values (step 298) or permit the system, at step 300, to modify the designated values. The procedure of the second subroutine may be repeated through use of decision block 302. Once the user is finished with the second subroutine (step 304), s/he may proceed to the third subroutine or end.

If the user desires to use a subroutine other than the second subroutine (step 290) or simply proceed from the second subroutine (step 304), the process is directed to step 308. Referring to FIG. 14, if the user wishes to delete an existing compound (step 310), a selected compound is fetched (step 312) and the user designates, at step 314, a corresponding deletion operation. If the user confirms deletion, at step 314, then the fetched compound is, at step 316, deleted, otherwise, the deletion designation is, at step 318, cancelled. The procedure of the third subroutine may be continued through use of the decision at step 320. Once the user is finished with the third subroutine (step 322), s/he may proceed to the fourth subroutine or end.

If the user desires to use the fourth subroutine (step 308) or simply proceed from the third subroutine (step 322), the process is directed to step 326. In the four subroutine model of FIGS. 13 and 14, it is assumed that any users accessing the fourth subroutine intend to program a job ticket for an additional output. The programming of an additional output is obtained with the steps shown in FIG. 9. Through use of decision step 28, a user may program as many additional outputs as required. As each additional electronic job ticket is generated, it is added to the link list of the preexisting composite job ticket.

Figure 15:
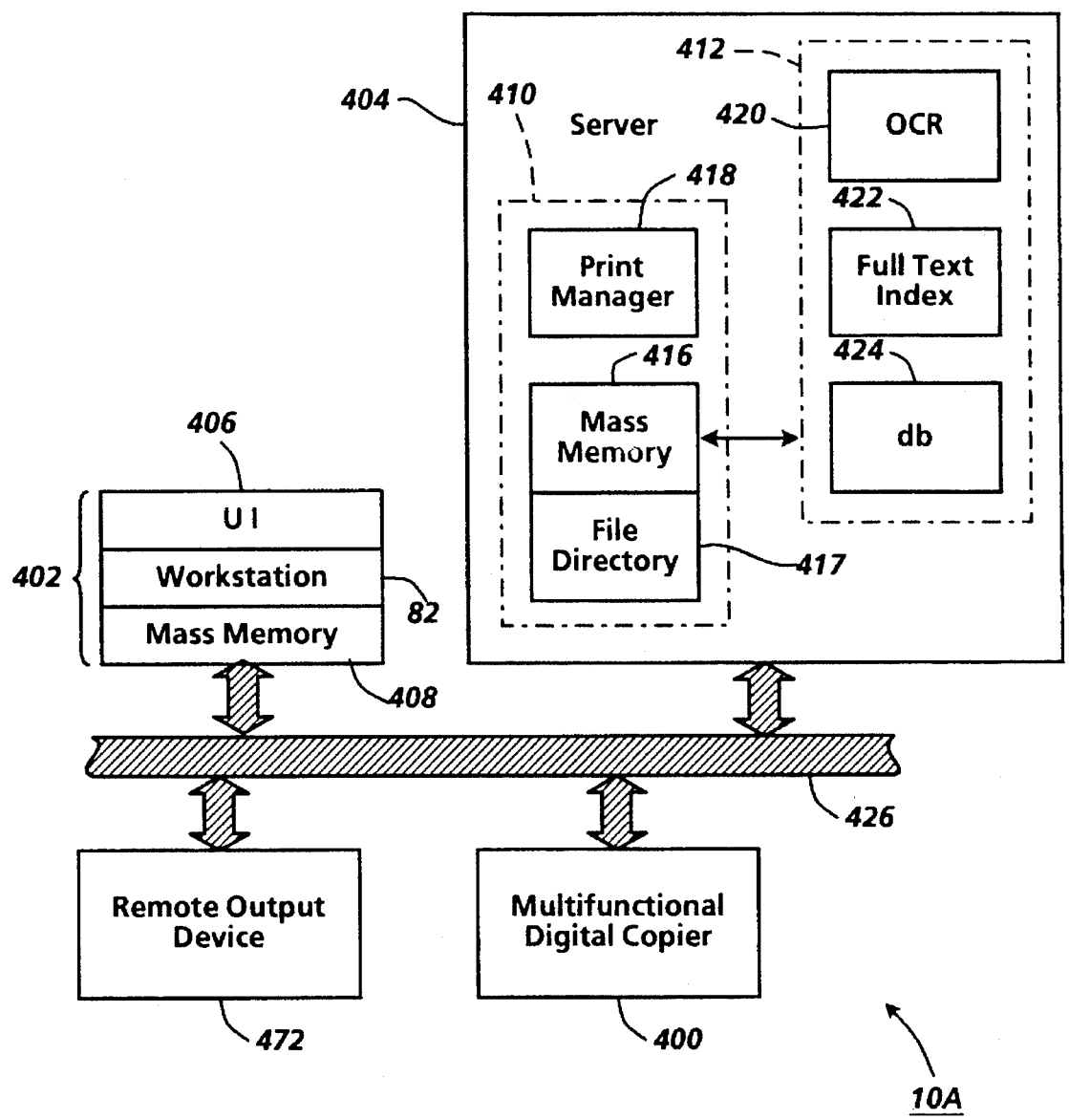
FIG. 15 is a block diagram of a printing system including basic subsystems desirable for implementing a preferred embodiment of the present invention.

Referring to FIGS. 15–19, a preferred technique of processing a job is disclosed. In accordance with the above-described embodiment, a composite job ticket is programmed with the UI 210 (FIG. 2) of system 10 (FIG. 1). It is not unusual, however, for a multifunctional copier to simply include a 10 key pad for input rather than a more elaborate user interface with a keyboard of the type contemplated by FIG. 2. It will be appreciated by those skilled in the art, that developing a composite job ticket of the type described above is not feasible without the ability to enter alphanumeric values at the UI. Referring to FIG. 15, a system 10a which permits the use of a composite job ticket of the type described above at a multifunctional digital copier without a keyboard, is shown.

In particular, the system 10a includes a multifunctional digital copier 400, a client 402 and a file server 404. The multifunctional digital copier is similar in structure to the above-described system 10 except that it only includes a UI having a 10 key pad with a simple LCD display, the LCD display only being capable of displaying a relatively few lines of alphanumeric characters. The client 402 includes the workstation 82 (FIG. 5) coupled with a UI 406 and mass memory 408. Preferably, the UI 406 possesses capabilities similar to that of UI 210 (FIG. 2), the same capability which permits the programming of a composite job ticket.

The server 404 includes, as a minimum, a storage subsystem 410 and an archiving subsystem 412. The storage subsystem 410 includes a mass memory 416 communicating with a file manager 418. In practice, the mass memory includes a file directory 417, for listing the contents of the memory, and the file manager 418 is responsible for moving information into and out of mass memory 416. As can be appreciated, an implementation of a server 404 would include some sort of transport mechanism using a suitable protocol, for moving data into and out of the server 404.

The significance of the archiving subsystem 412, which includes an optical character recognition apparatus 420, a full text indexer 422 and a database 424, will be discussed in further detail below. Each of the copier 400, client 402 and file server 404 communicate with each other by way of a suitable network connection 426. In one example, a networked system of the type shown in FIG. 15 could be implemented readily using preexisting hardware and software presently sold by Xerox and Novell Corporations. Indeed, much of the conceptual framework for the illustrated embodiment of FIG. 15 can be obtained by reference to the Docutech network server.

Figure 16:
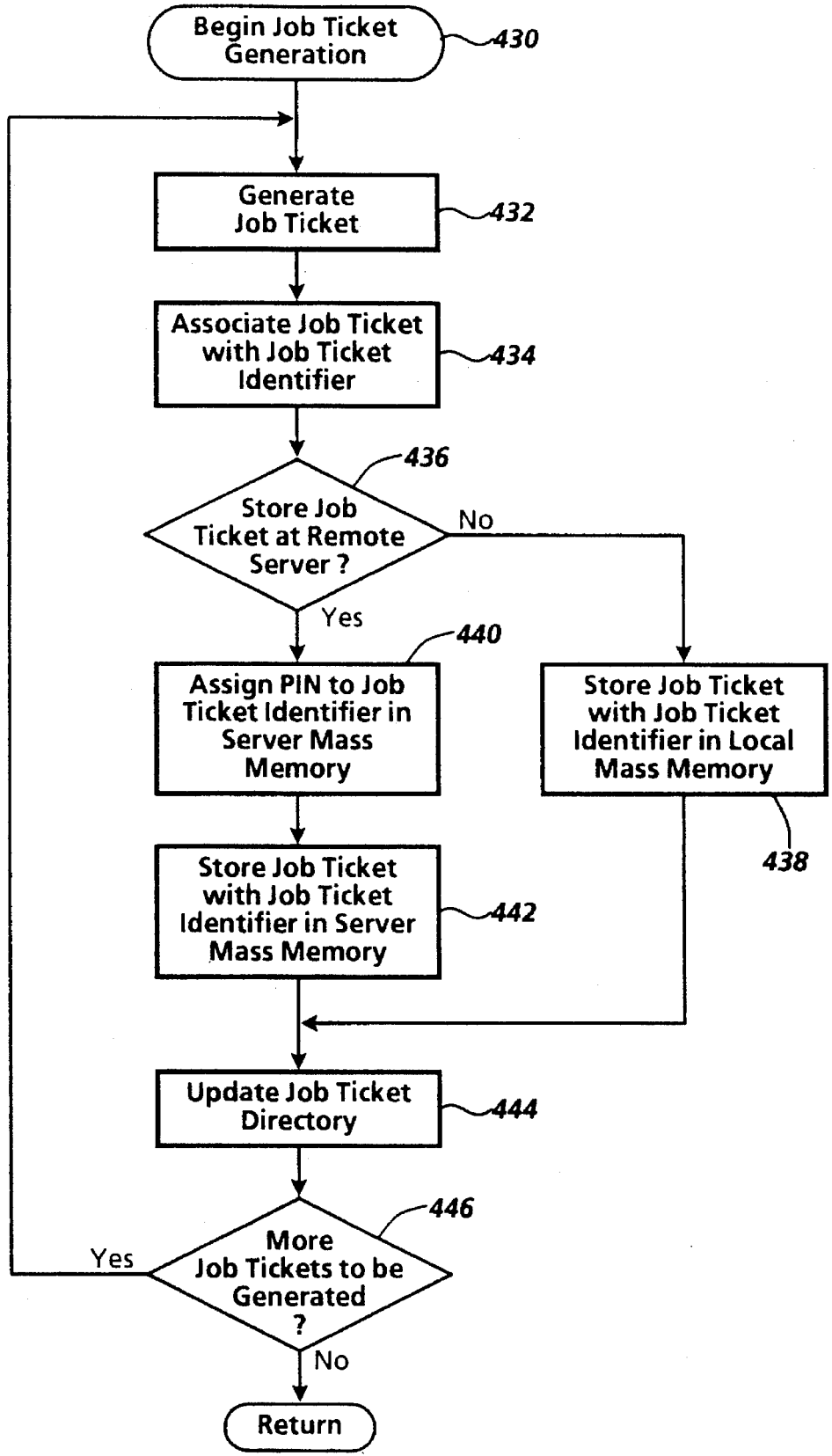
FIGS. 16–19 represent a job processing technique for use with the printing system of FIG. 15.
Figure 17:
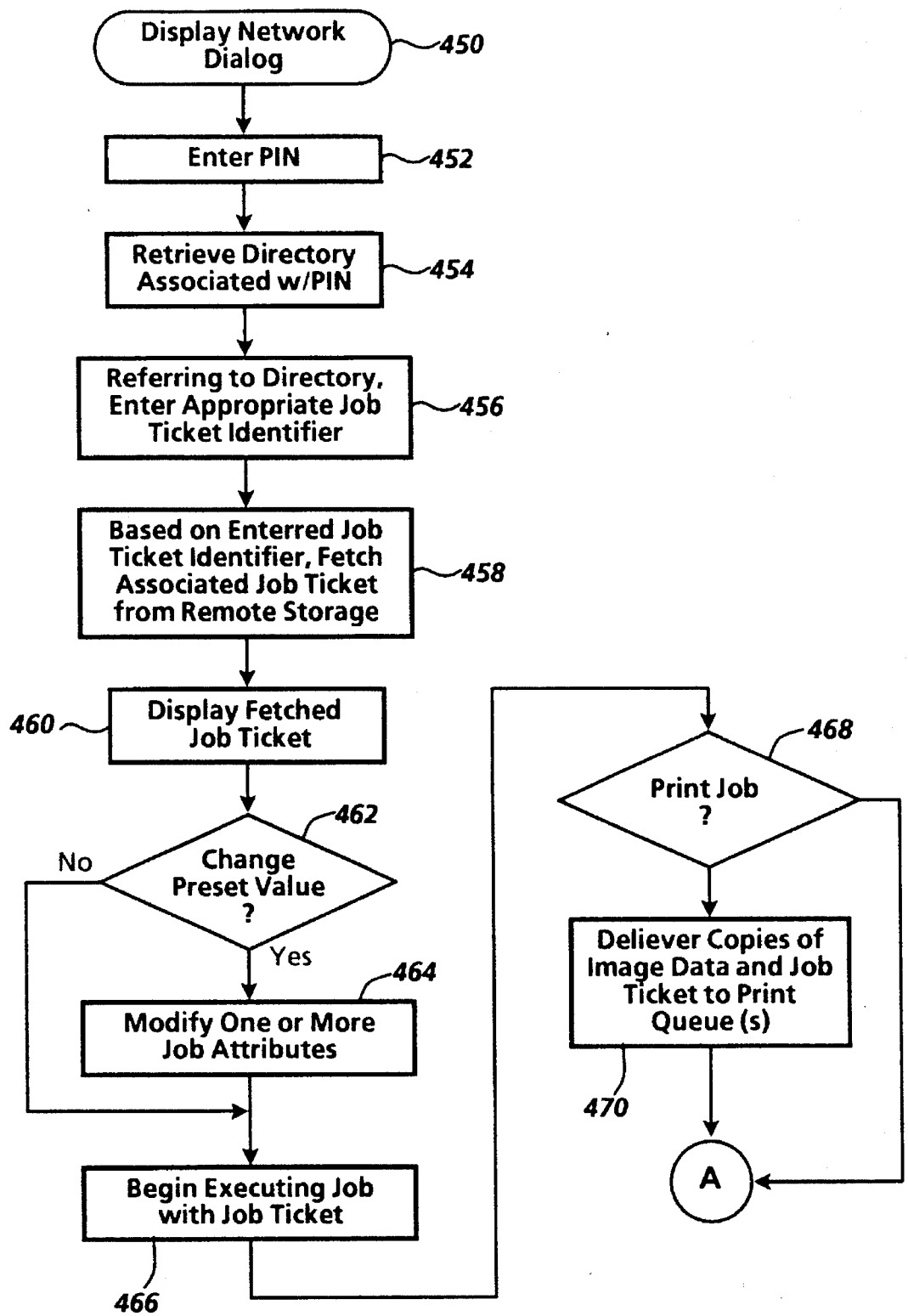
Figure 18:
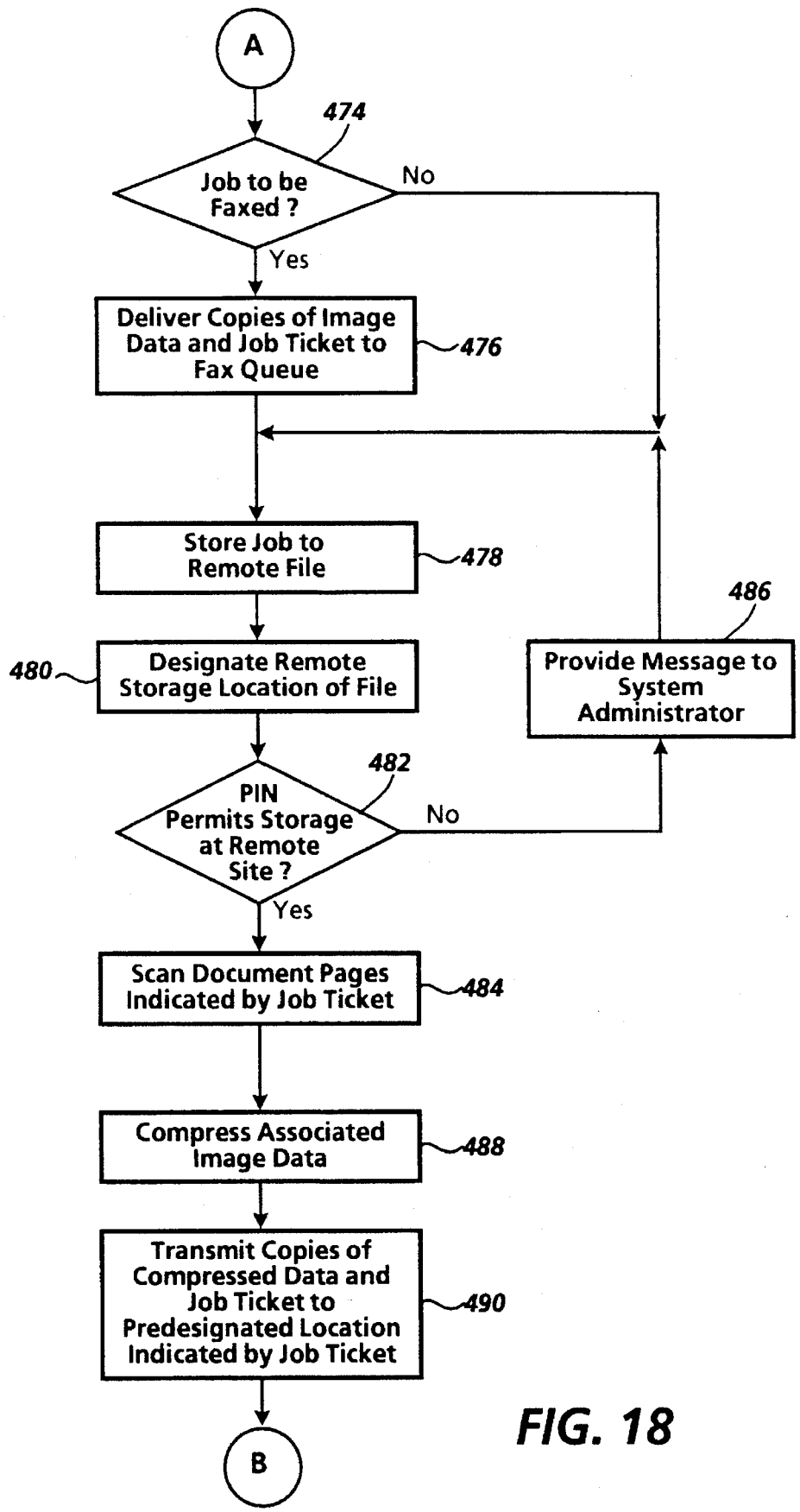

Referring to FIG. 15, in conjunction with FIGS. 16–19, a technique for generating a job ticket, possibly a composite job ticket, at a given client and using that job ticket at a multifunctional digital copier, which is remote from the client is shown. In the contemplated technique of FIGS. 16–19, a job ticket is generated and stored (FIG. 16) and then used to program a job at a copier remotely disposed relative to the location at which the job ticket was generated FIG. 17–19. FIG. 18 includes a scan-to-file routine permitting storage of documents in an archival fashion.

Referring specifically to FIG. 16, job ticket generation begins at the workstation 82 with step 430. Upon generating the job ticket at step 432, the generated job ticket is associated with a job ticket identifier at step 434. A decision is made at step 436 to determine whether the job ticket, with its associated job ticket identifier, should be stored in mass memory 408 (FIG. 15) or mass memory 416. It will be appreciated by those skilled in the art that while the term "server" is used to describe the apparatus 404, it is contemplated that the client 402 could also serve as a server.

If the client 402 is to act as the server, the job ticket generated with step 432 is stored at step 438, along with an associated job ticket identifier, in local mass memory 408; otherwise, the job ticket is assigned a personal identifier number ("PIN"), at step 440 and then transmitted to the file manager 418. In turn, at step 442, the job ticket is stored with its corresponding job ticket identifier in the server mass memory 416. Upon storing the job ticket, the file directory 417 is updated (step 444) and a check is performed at step 446 to determine if any more job tickets are to be generated at the client 402.

Referring to FIG. 17, in order to develop a job at the multifunctional digital copier 400 with a composite job ticket from either the client 402 or the server 404, a network dialog (not shown) is displayed at step 450 and a user enters his or her PIN by way of a conventional 10 key pad (not shown) of the copier 400. In one example, a system administrator preconfigures the server 404 so that preprovided PINs are mapped in the server against corresponding sets of job ticket/job ticket identifier combinations. In response to the entrance of the PiN at step 452 an authentication procedure is performed at the server 404 (or the client 402 when the client is used as the server) to determine if the user has a set of job ticket/job ticket identifiers resident on the server.

In response to receiving the PIN, a directory portion associated with the PIN is retrieved via step 454 at the copier 400. Referring to the directory portion, the user, at step 456, enters an appropriate job ticket identifier, indicated in the directory, in order to fetch the job ticket associated with the entered job ticket identifier. Based on the entered job ticket identifier, a job ticket associated with the same is transmitted from mass memory 416, via step 458, to the copier 400 where the fetched job ticket is, at step 460, displayed on the LCD display.

Preferably, at least portions of the job ticket are displayed, at the copier 400, with one or more preset values, each value serving to describe an attribute of a job to be outputted. By way of steps 462 and 464, one or more values, preset at a remote location with a keypad, can be modified via the 10-key pad of the copier 400. In one example, step 464 would include modifying certain variable directives, such as the magnification to be applied for the job to be executed.

After deciding on the values to be used at the copier, execution of the job is begun at step 466. Since the copier 400, in the preferred embodiment is a multifunctional digital copier, a wide variety of output services can be provided. While these services are provided in accordance with the preprogramming of the job ticket imported to the copier, one of several actions may be required depending on the type of output desired by the system user. Initially, at step 468, it is determined whether the job is to be printed. If printing is desired, at one or more locations, copies of image data representative of the document to be printed and the programmed job ticket are transmitted, via step 470, to one or more print queues. As should be understood, a given print queue may be local to the digital copier 400 or disposed in a remote location, such as at the remote output device 472 of FIG. 15 [check 468, 470].

Referring to FIG. 18, when a job is to be faxed (steps 474 and 476) copies of image data and job ticket(s) are delivered to a fax queue. As will be appreciated, the faxing facility can be resident to the copier 400 (as is the case with the system 10 in FIG. 2) or can be remote to the copier as with the remote device 472 shown in FIG. 15. Subsequent to the decision of 476, it is determined, at step 478, whether a job, with its attendant image data and job ticket, are to be stored at a remote file, such as in the mass memory 408 or 416. Steps 480, 482 and 484 serve to prepare a job for a special remote storage operation, known as "scan-to-file".

At step 480, it is designated that the file to be prepared is intended for storage at a specific location and then, at decision 482, it is determined whether the previously entered PIN permits storage at the designated remote site. If the designated remote site has not been configured to receive a file from a user having the entered PIN, a message, apprising a system user or administrator of an improper designation, is provided by way of step 486. Assuming that the entered PIN permits storage at a designated remote site, document pages indicated by a job ticket are scanned at a rasterizing device of the type shown in FIG. 1. As will be appreciated by those skilled in the art, the scanned information is captured and thereby converted into suitable image data.

In the preferred embodiment, scanned image data is compressed, via step 488, pursuant to storage by way of a suitable compression scheme of the type provided in FIG. 2. In turn, at step 490, copies of compressed image data and job ticket(s) are transmitted to predesignated locations indicated by the job ticket. It will be recognized that the job ticket could indicate storage and/or output of the scanned image data at multiple sites. For instance, a first set of image data/job ticket could be stored in the mass memory 408, a second set of image data/job ticket could be stored in the mass memory 416, and image data could be used to produce prints at the remote output device 472 in accordance with the programmed job ticket.

As indicated above, the job ticket can be reprogrammed to accommodate for revised values in a job. As shown at step 494, if a job ticket is not revised there is no reason to save it since an original is maintained at either mass memory 408 or 416, so the job ticket and its corresponding identifier, which were buffered at the copier, is preferably deleted at step 496. On the other hand, if the job ticket is revised, the copier user is provided, at step 498, with the opportunity to save the revised ticket. Assuming that the user wishes to save the revised job ticket, the revised job ticket is associated with a job ticket identifier, at step 500, and a copy of the revised job ticket with its attendant job ticket identifier is stored by way of step 502 in a selected mass memory section. Upon storing the copy of the revised job ticket with its job ticket identifier, it is desirable to delete copies of the same at the copier so that memory availability can be maximized at the copier for purposes of performing a wide range of input/output functions.

In a variation of the technique described above a job could be programmed with a plurality of segments, each of which has its origin in a separate job ticket. In this variation, the separate job tickets would be obtained from a source remote of the host printing machine for cutting and pasting at the host. In this manner, attributes from several job tickets could be incorporated into a single job for processing.

Figure 20:
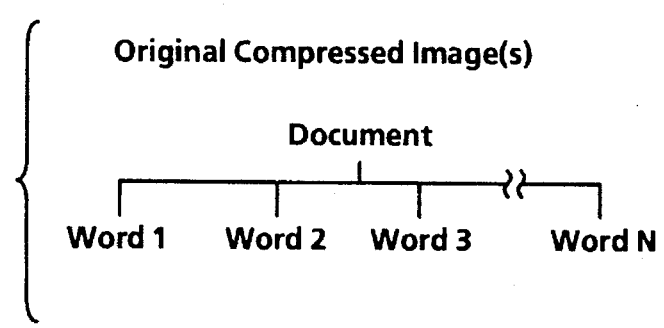
FIG. 20 is a schematic representation of the contents of a database portion, the contents including image data, corresponding with one or more images of a document and a word distribution for the document.

Referring to FIGS. 15 and 20 it will be noted that the remote storage routine discussed with respect to FIG. 18 can be enhanced through the use of an archiving system. In particular, with one exemplary archiving subsystem 412 a string of words is scanned with a conventional OCR apparatus 420. For further teaching regarding optical character recognition, reference can be made to U.S. Pat. No. 4,003,343 to Wilmer, the pertinent portions of which are incorporated herein by reference. The OCR apparatus works in conjunction with a full text indexer which includes suitable software for determining the distribution of each scanned word in a given document. Frequency determination is taught by U.S. Pat. No. 5,369,714 to Withgott et al. and suitable software for indexing is designated in U.S. Pat. No. 5,328,169 to Mandel—the pertinent portions of the '719 and '169 patents being incorporated herein by reference.

To more fully understand how the full text indexer works in conjunction with the database 424, reference is made to FIG. 20. More particularly, the OCR apparatus, in conjunction with the full text indexer creates a word distribution of the scanned document in which a count is associated with each word. In turn, for each image in a document, the original compressed image or images and the word count distribution are stored in the database 424 as shown in FIG. 20. Accordingly, through use of a suitable arrangement including a keyboard and a processor, which arrangement may, in one example, reside at the client 402, a user may input a search term and thereby access the database 424 to determine the frequency of occurrence of that particular search word. In this way, the user can locate a document with the simple knowledge that a particular word occurs at a relatively high frequency in the document. In one example, if a user knows that a document includes the word "triangle" with a high degree of frequency, the user can enter that word as a search term and the archiving arrangement 412 will provide the user with an indication of how many times that word occurs in a given document.

It should be appreciated that through use of OCR, the functionality of the presently disclosed implementation can be greatly enhanced. That is, the implementation of the presently disclosed embodiment is further optimized when the user has access to OCR capability during job ticket programming and the OCR is provided as a driver to workflow management software. In one contemplated example, when the user of the multifunctional machine 10 has access to OCR it is possible to build or customize a job ticket for a document to be processed. More particularly, for those instances in which the user possesses a document for processing, but is not totally familiar with the contents of the document, the document could be scanned with OCR, which could be imported to the multifunctional machine, for enhancing the user's knowledge of the attributes or characteristics of the document. In turn, in view of the knowledge gained by way of such OCR scanning, the user could go out on the network and obtain one or more job ticket portions necessary to suitably program the job ticket for the document in process.

Numerous features of the above-described embodiment will be appreciated by those skilled in the art: In particular, a versatile, flexible system for importing a job ticket to a printing machine from a storage site remote to the printing machine is provided. In practice, the system permits a user to display a directory of job tickets located at the remote storage site and select a job ticket to be used in processing a job. Provided the user has entered an appropriate personal identifier number to the printing machine, the selected job ticket is transmitted to the printing machine where the user can modify selected values to accommodate for the job being processed.

Since the printing machine is preferably a multifunctional copier, a wide range of input/output functionality is provided. Consequently, when a composite job ticket is used to process a job, the job can be outputted at local and/or remote output sites as well as stored at local and/or remote storage sites. As will be appreciated, storing jobs at a remote storage site can maximize the useful memory of the printing machine and optimize the efficiency of the environment in which the printing machine may operate.

In one approach to remote storage, a hardcopy document is scanned, with an image capture device, and transmitted to a remote file. In this approach, which is referred to as "scan-to-file", the user obtains a job ticket from the remote storage site, scans the document in accordance with the control instructions of the obtained job ticket and transmits the resulting image data to the file. In one example, the obtained job ticket is sent along to the file for use in outputting the stored image data at a future time.

The scan-to-file approach can be used advantageously with an archiving system in which the document is read with a word recognition program and the recognized words are indexed with a word indexer to generate a word distribution indicating the frequency with which selected words occur throughout the document. Accordingly, when the user wishes to locate the archived document, s/he can use one of the selected words to search, and possibly retrieve, an electronically stored version of the document.

What is claimed is:

1. In a network printing system for creating a document job at a document processing apparatus to be transmitted across a network to an output or storage location disposed remotely of the document processing apparatus the document job being developed In accordance with a job ticket including a set of document processing control instructions for controlling a manner in which the document processing apparatus develops a set of image data for creating the document job, the job ticket having been developed at a processing station disposed on the network remotely of the document processing apparatus and corresponding to a selected job ticket identifier with both the job ticket and selected job ticket identifier being stored in a memory disposed on the network remotely of the document processing apparatus, said document processing apparatus comprising:

a) an input subsystem for inputting a personal identifier to the document processing apparatus;
   b) a user interface for displaying, in response to the inputting of the personal identifier a job ticket identifier directory including a plurality of job ticket identifiers one of which plurality of job ticket identifiers includes the selected job ticket identifier, the user interface and input subsystem functioning cooperatively to permit the user to employ the selected job ticket identifier for facilitating transmission of a copy of the set of document processing control instructions to the document processing apparatus;
   c) a document processing apparatus memory for storing the set of document processing control instructions;
   d) an information retrieval subsystem for retrieving a copy of the set of document processing control instructions across the network from the remotely disposed memory to said document processing apparatus memory in response to selecting the selected job ticket identifier from the job ticket identifier directory;
   e) an image capture subsystem for developing the set of Image data, the image data being automatically developed in a preprogrammed manner, in accordance with the set of document processing control instructions stored in said document processing apparatus memory, to create the document job while minimizing an amount of job programming required by the user at said document processing apparatus; and
   f) an image data transmission subsystem for transmitting one or more copies of said set of image data across the network for storage at the storage location or outputting at the output location.

2. The document processing apparatus of claim 1, In which the document processing control instructions include a plurality of job attributes characterized by a set of values, further including:

g) a programming subsystem for reprogramming the document processing control instructions, wherein the set of values is displayed with said programming subsystem and the set of values is modified to vary one of the plurality of job attributes.

3. The document processing apparatus of claim 1, in which a network memory area is disposed remotely of said document processing apparatus on the network, wherein a copy of the set of image data along with a copy of a subset of the document processing control instructions are stored in the network memory area for outputting a representation of the set of image data.

4. The document processing apparatus of claim 3, in which the network memory area communicates with an output subsystem, wherein the representation of the copy of the set of image data is outputted with the output subsystem.

5. The document processing apparatus of claim 4, In which the output subsystem is disposed on the network remotely of said document processing apparatus, wherein said document processing apparatus includes an output subsystem for outputting a representation of the copy of the set of image data so that representations of the copy of the set of image data are outputted at the output subsystem of the document processing apparatus and the output subsystem disposed on the network.

6. The document processing apparatus of claim 1, In which the set of image data is developed from a hardcopy document and said document processing apparatus includes a subsystem for reading the hardcopy document and converting contents thereof to the set of image data.

7. The document processing apparatus of claim 6, in which a network memory area is disposed remotely of said document processing apparatus on the network, wherein a copy of the set of image data along with a copy of a subset of the document processing control instructions are stored in the network memory area for outputting a representation of the set of image data.

8. The document processing apparatus of claim 7, in which the network memory area communicates with an output subsystem, wherein the representation of the copy of the set of image data is outputted with the output subsystem.

9. The document processing apparatus of claim 7, wherein;

the copy of the set of image data is stored in the network memory area the hardcopy document is scanned with a character recognition program to determine a distribution of word occurrences in the hardcopy document; and the determined distribution is stored in the network memory area for employment by a document processing system user in locating the copy of the set of image data in the network memory area.

10. The document processing apparatus of claim 1, wherein the set of image data is analyzed with a character recognition program and the selected job ticket identifier is selected on the basis of results obtained from said analysis.

11. The document processing apparatus of claim 1, wherein the image capture subsystem is part of a page description language decomposer and the set of image data is developed by processing an electronic document corresponding with the document job.

12. The document processing apparatus of claim 1, wherein the processing station is disposed on the network remotely of the memory disposed on the network.

13. In a network printing system where a document job is developed in accordance with a job ticket including a set of document processing control instructions for controlling a manner in which a document processing apparatus develops a set of image data for creating the document job, the job ticket having been developed at a processing station disposed on a network remotely of the document processing apparatus and corresponding to a selected job ticket identifier with both the job ticket and selected job ticket identifier being stored in a memory disposed on the network remotely of the document processing apparatus, a method of creating the document job at the document processing apparatus and transmitting the document job across the network to an output or storage location disposed remotely of the document processing apparatus, comprising:

a) inputting a personal identifier to the document processing apparatus:

b) in response to said step a), displaying a job ticket identifier directory including a plurality of job ticket identifiers one of which plurality of job ticket identifiers includes the selected job ticket identifier;

c) selecting the selected job ticket identifier from the job ticket identifier directory;

d) in response to said step c), retrieving a copy of the set of document processing control instructions across the network from the remotely disposed memory to a document processing apparatus memory:

e) storing the set of document processing control instructions in the document processing apparatus memory;

f) developing the set of image data automatically in a preprogrammed manner, with an image capture subsystem, in accordance with the set of document processing control instructions stored in the document processing apparatus memory, to create the document job while minimizing an amount of programming required by the user at the document processing apparatus; and g) transmitting one or more copies of the set of image data across the network for storage at the storage location or outputting at the output location.

14. The method of claim 13, in which a network memory area is disposed remotely of the document processing apparatus on the network further comprising storing a copy of the set of image data along with a copy of a subset of the document processing control instructions in the network memory area for outputting a representation of the set of image data.

15. The method of claim 14, in which the set of image data is developed from a hardcopy document further comprising reading the hardcopy document with a document reading subsystem and converting contents of the hardcopy document to the set of image data.

16. The method of claim 13, further comprising analyzing the set of image data with character recognition program so that the selected job ticket identifier is selectable on the basis of results obtained with said analysis.

* * * * *